US012613767B2

(12) United States Patent
Baronne

(10) Patent No.: US 12,613,767 B2
(45) Date of Patent: *Apr. 28, 2026

(54) PARKING THREADS IN BARREL PROCESSOR FOR MANAGING HAZARD CLEARING

(71) Applicant: Micron Technology, Inc., Boise, ID (US)

(72) Inventor: Christopher Baronne, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/819,616

(22) Filed: Aug. 29, 2024

(65) Prior Publication Data

US 2024/0419534 A1 Dec. 19, 2024

Related U.S. Application Data

(63) Continuation of application No. 17/897,926, filed on Aug. 29, 2022, now Pat. No. 12,099,402.

(51) Int. Cl.
| *G06F 11/00* | (2006.01) |
| *G06F 9/38* | (2018.01) |
| *G06F 11/07* | (2006.01) |

(52) U.S. Cl.
CPC ........ *G06F 11/0793* (2013.01); *G06F 9/3861* (2013.01); *G06F 11/0721* (2013.01)

(58) Field of Classification Search
CPC . G06F 11/0721; G06F 11/0793; G06F 9/3861
See application file for complete search history.

(56) References Cited

U.S. PATENT DOCUMENTS

| 7,822,950 | B1 | 10/2010 | Fotland |
| 2005/0125786 | A1 | 6/2005 | Dai et al. |
| 2007/0106883 | A1 | 5/2007 | Choquette |
| 2010/0325280 | A1 | 12/2010 | Jindal et al. |
| 2013/0332711 | A1 | 12/2013 | Leidel et al. |
| 2014/0089734 | A1 | 3/2014 | Busaba et al. |
| 2015/0149744 | A1 | 5/2015 | Pedersen |
| 2015/0220347 | A1 | 8/2015 | Glossner et al. |
| 2016/0275123 | A1 | 9/2016 | Lin et al. |
| 2016/0357565 | A1 | 12/2016 | Greenhalgh et al. |
| 2018/0365016 | A1 | 12/2018 | Luliano et al. |
| 2020/0192742 | A1 | 6/2020 | Boettcher et al. |
| 2022/0121483 | A1 | 4/2022 | Baronne et al. |
| 2022/0121485 | A1 | 4/2022 | Baronne et al. |
| 2022/0121486 | A1 | 4/2022 | Baronne et al. |

(Continued)

FOREIGN PATENT DOCUMENTS

CN          117632403 A        3/2024

*Primary Examiner* — Joshua P Lottich
(74) *Attorney, Agent, or Firm* — Schwegman Lundberg & Woessner, P.A.

(57) ABSTRACT

Devices and techniques for parking threads in a barrel processor for managing hazard clearing are described herein. A barrel processor includes hazard management circuitry that is used to receive an indication of an instruction executing in a compute pipeline of the barrel processor, the instruction having encountered a hazard and unable to progress through the compute pipeline; store the indication of the instruction in a hazard memory; receive a signal indicating that the hazard has cleared; and cause the instruction to be rescheduled at the beginning of the compute pipeline in response to the signal.

20 Claims, 13 Drawing Sheets

(56)             References Cited

U.S. PATENT DOCUMENTS

| | | |
|---|---|---|
| 2022/0121487 A1 | 4/2022 | Baronne et al. |
| 2022/0206804 A1 | 6/2022 | Vanesko et al. |
| 2022/0206846 A1 | 6/2022 | Windh et al. |
| 2022/0206937 A1 | 6/2022 | Windh et al. |
| 2022/0237020 A1 | 7/2022 | Brewer |
| 2022/0308887 A1 | 9/2022 | Park |
| 2022/0308888 A1 | 9/2022 | Park |
| 2024/0070011 A1 | 2/2024 | Baronne |

400

412

414

THREAD CONTROL

HTP CORE

402

DISPATCH
INTERFACE

DATA CACHE

TBL

INSTRUCTION
CACHE

404

MEMORY INTERFACE

410

406

408

416

NOC INTERFACE

NOC

900

| 31 | 27 26 25 24 | 20 19 | 15 14 13 12 11 | 7 6 | 0 | |
|---|---|---|---|---|---|---|
| 00000 | rc | 00000 | 00000 | nf | cc | 00000 | 1110010 | EFC.HTA0 (HTP) |
| 00010 | rc | 00000 | 00000 | nf | cc | 00000 | 1110010 | EFC.HTA1 |
| 00100 | rc | 00000 | 00000 | nf | cc | 00000 | 1110010 | EFC.HTA2 (HTF) |
| 00110 | rc | 00000 | 00000 | nf | cc | 00000 | 1110010 | EFC.HTA3 |
| 11000 | rc | 00000 | 00000 | nf | cc | 00000 | 1110010 | EFC.HTA0H.BF (HTP) |

1202 — RECEIVE AN INDICATION OF AN INSTRUCTION EXECUTING IN A BARREL PROCESSOR COMPUTE PIPELINE ENCOUNTERING A HAZARD

1204 — STORING THE INDICATION OF THE INSTRUCTION

1206 — RECEIVING A SIGNAL INDICATING THAT THE HAZARD HAS CLEARED

1208 — CAUSING THE INSTRUCTION TO BE RESCHEDULED AT THE BEGINNING OF THE COMPUTE PIPELINE

PARKING THREADS IN BARREL PROCESSOR FOR MANAGING HAZARD CLEARING

PRIORITY APPLICATION

This application is a continuation of U.S. application Ser. No. 17/897,926, filed Aug. 29, 2022, which is incorporated herein by reference in its entirety.

GOVERNMENT RIGHTS

This invention was made with government support under Agreement No. PNNL DE-AC05-76RL01830, awarded by the Pacific Northwest National Laboratory. The government has certain rights in this invention.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

Software execution may be multithreaded using multiple threads within a process, where each thread may execute independently but concurrently, while sharing process resources. Data may be communicated between threads using inter-thread communication methods. Additionally, execution of threads or processes may be coordinated.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

To easily identify the discussion of any particular element or act, the most significant digit or digits in a reference number refer to the figure number in which that element is first introduced.

FIG. 9 is a table that illustrates fiber create instructions, according to an embodiment.

DETAILED DESCRIPTION

Figure 1:
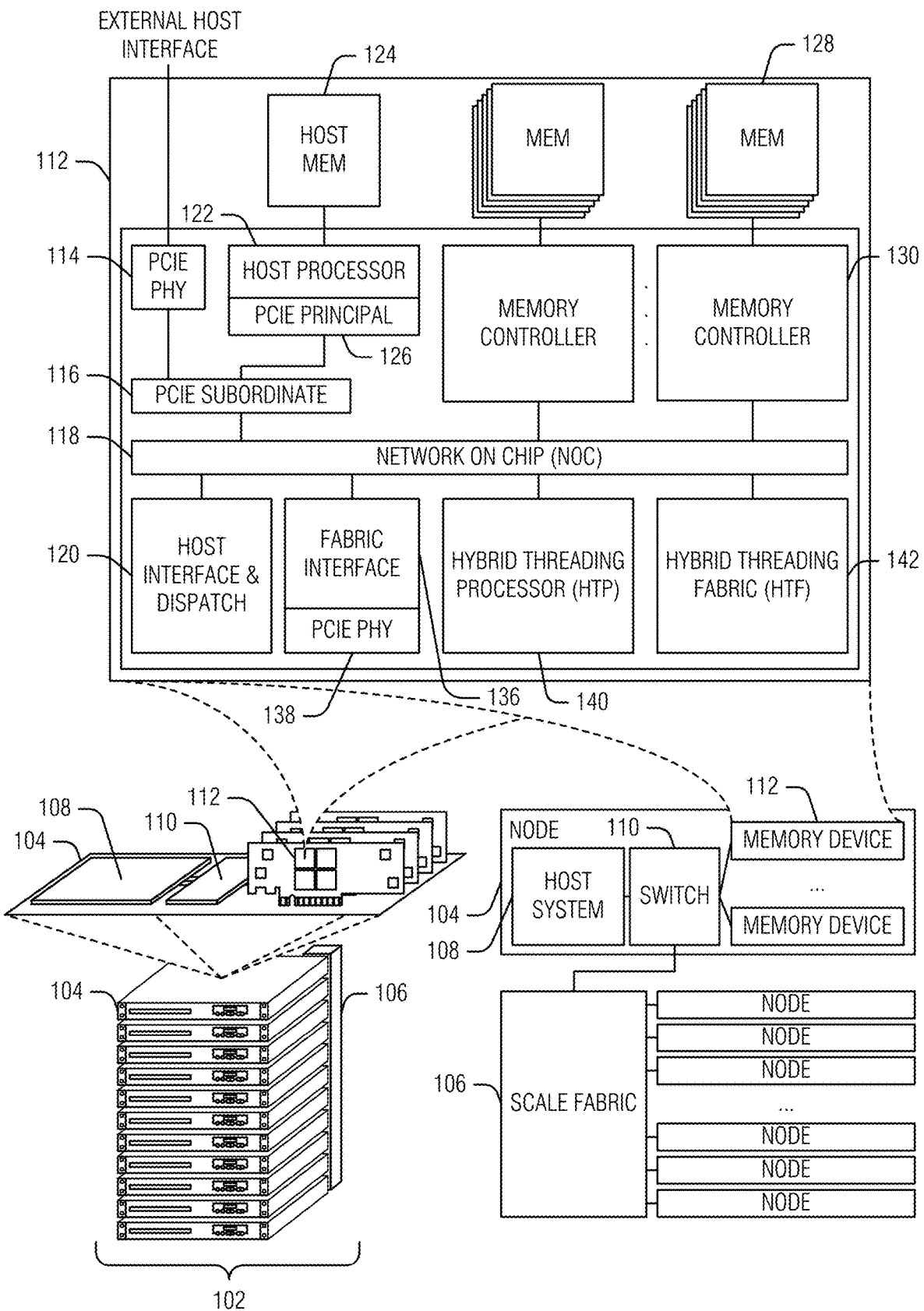
FIG. 1 illustrates generally a first example of a first memory-compute device in the context of a memory-compute system, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a compute-near-memory system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a compute-near-memory system can be particularly suited for implementing a hierarchy of instructions and nested loops (e.g., two, three, or more, loops deep, or multiple-dimensional loops). A standard compiler can be used to accept high-level language instructions and, in turn, compile directly into the dataflow architecture of one or more of the nodes. For example, a node in the system can include a hybrid threading fabric accelerator. The hybrid threading fabric accelerator can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

Figure 6A:
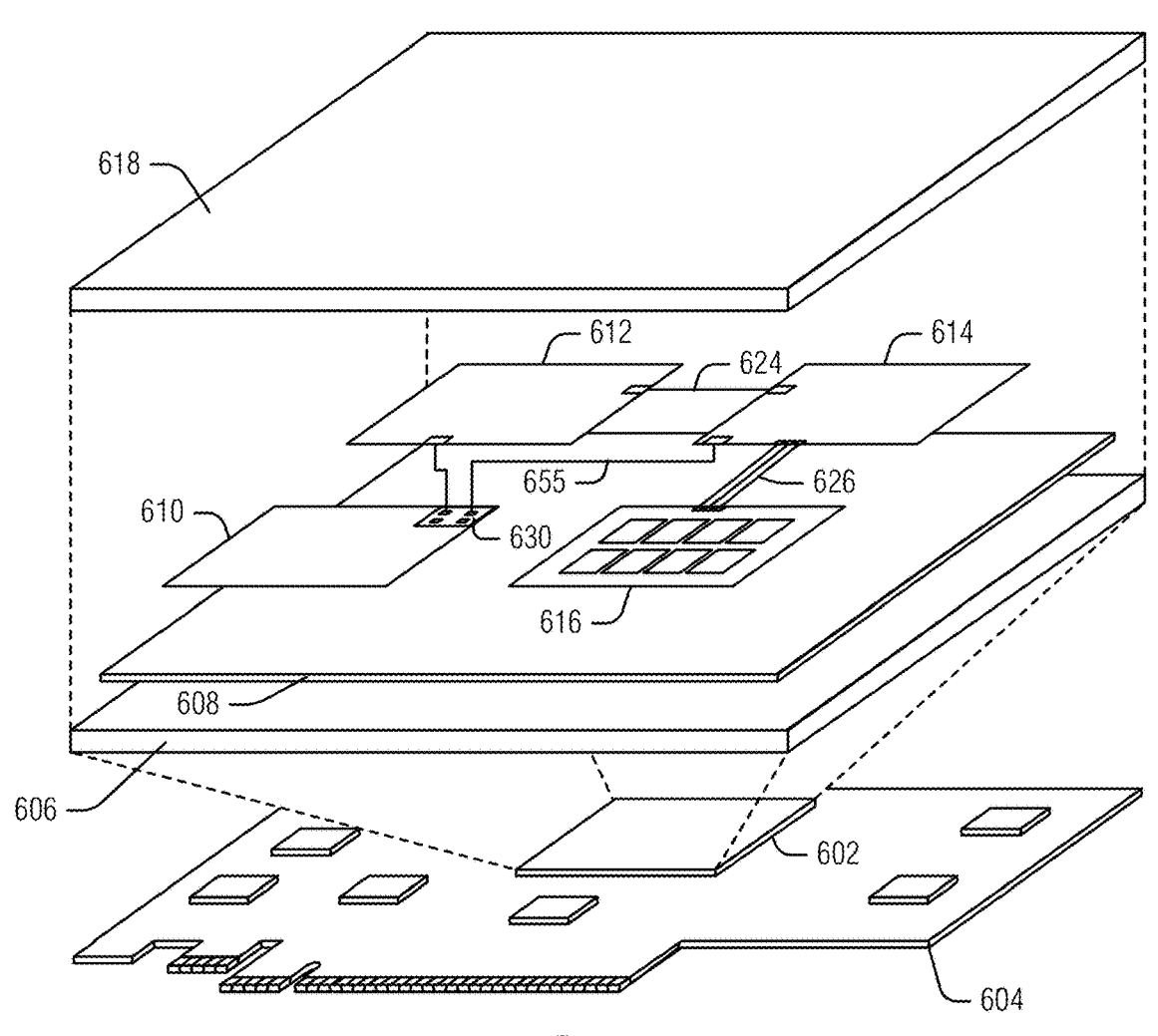
FIG. 6A illustrates generally an example of a chiplet system, according to an embodiment.
Figure 6B:
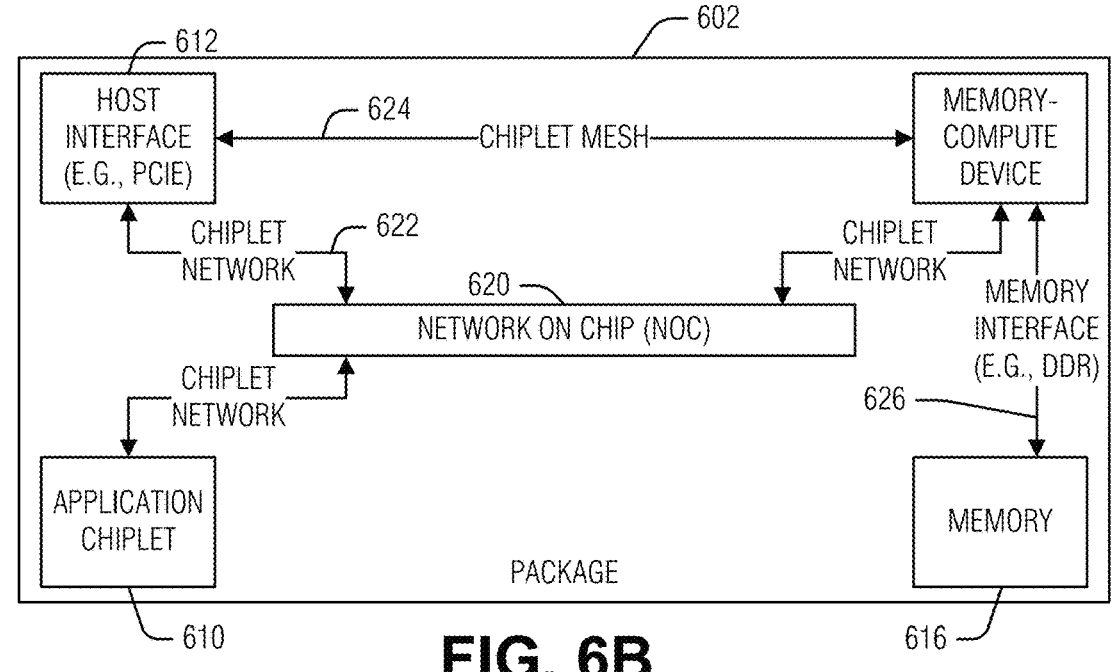
FIG. 6B illustrates generally a block diagram showing various components in the chiplet system from the example of FIG. 6A.

A compute-near-memory system, or nodes or components of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits than single die chips, including higher yields or reduced development costs. FIG. 6A and FIG. 6B, discussed below, illustrate generally an example of a chiplet system such as can comprise a compute-near-memory system.

In some computing tasks, hundreds or even thousands of threads may be used for parallel processing. Threads may execute asynchronously. As discussed herein, an HTP supports thread creation by executing an instruction that creates and sends a thread create packet. Threads are executed in the HTP, which is a barrel processor.

In general, barrel processors may be implemented to process a thread instruction through a pipeline that has several stages. In some designs, the compute pipeline cannot be stalled. This design is relatively easy to implement. However, in such a processor, when a hazard is recognized, the thread has to be rescheduled because the pipeline cannot stall. Rescheduling conventionally occurs through scheduling queues at the front of the pipeline. This type of pipeline rescheduling forces the thread through unnecessary re-processing and may experience the same hazard repeatedly until the hazard is cleared. What is needed is a more efficient thread rescheduling mechanism.

The systems and methods described herein provide for on-demand rescheduling of threads that encounter a hazard. In an example, techniques described herein include mechanisms that enable putting a thread to sleep and then waking on demand when the hazard clears. In an example, the thread is parked in a queue near the end of the pipeline where memory is accessed. The mechanism consists of logic in the compute pipeline to identify hazards and steer threads encountering a hazard down a different execution path. The mechanism is flexible and allows for any number of hazard inputs to the logic. After a hazard clears in the pipeline, a signal is driven to this logic that releases any threads that were parked due to the specific hazard, reinserting them into a scheduling queue at the head of the pipeline in such a way that upon reentry into a scheduling queue and subsequent execution, the threads can be guaranteed not to encounter the same hazard.

The systems and methods described herein alleviate excessive thread scheduling congestion in a barrel processor when threads encounter hazards. Threads are allowed to park and sleep when encountering a hazard and then are signaled to wake on-demand when that hazard clears. The mechanism reuses existing paths in the compute pipeline to add a minimal amount of logic to support the feature. The mechanisms increase pipeline throughput and efficiency, and reduce overhead. The mechanisms also reduce the burden on the processor's thread scheduler by offloading some of the scheduling from the main scheduler. Additional details are set forth below.

A compute-near-memory system, or nodes or components of a compute-near-memory system, can include or use various memory devices, controllers, and interconnect fabrics, among other things. In an example, the system can comprise a computing fabric with various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide better performance (e.g., lower power consumption, reduced latency, etc.) than discretely packaged devices, and chiplets provide greater production benefits than single die chips. These production benefits can include higher yields or reduced development costs and time.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096)

using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced extensible Interface (AXI) is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
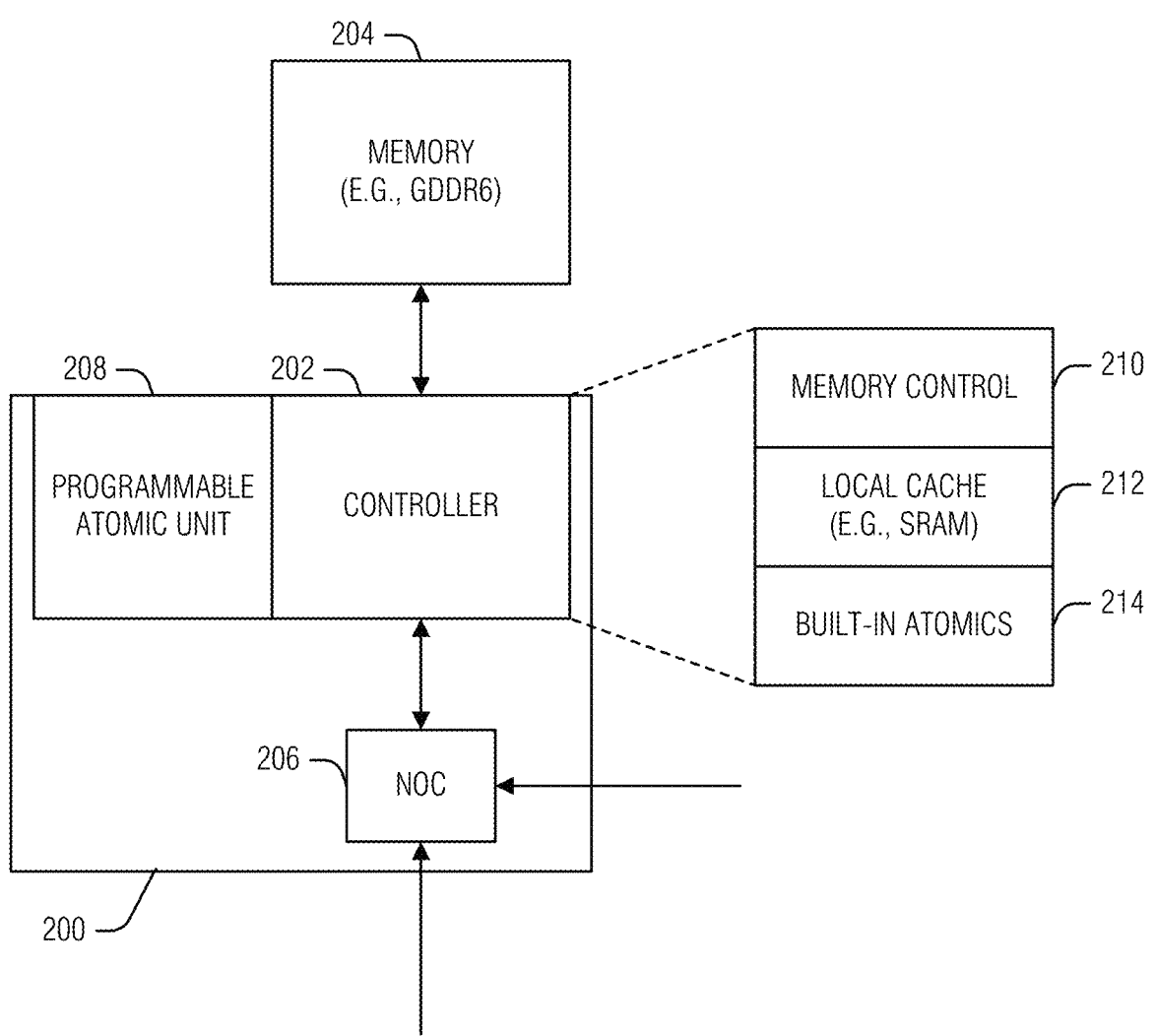
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
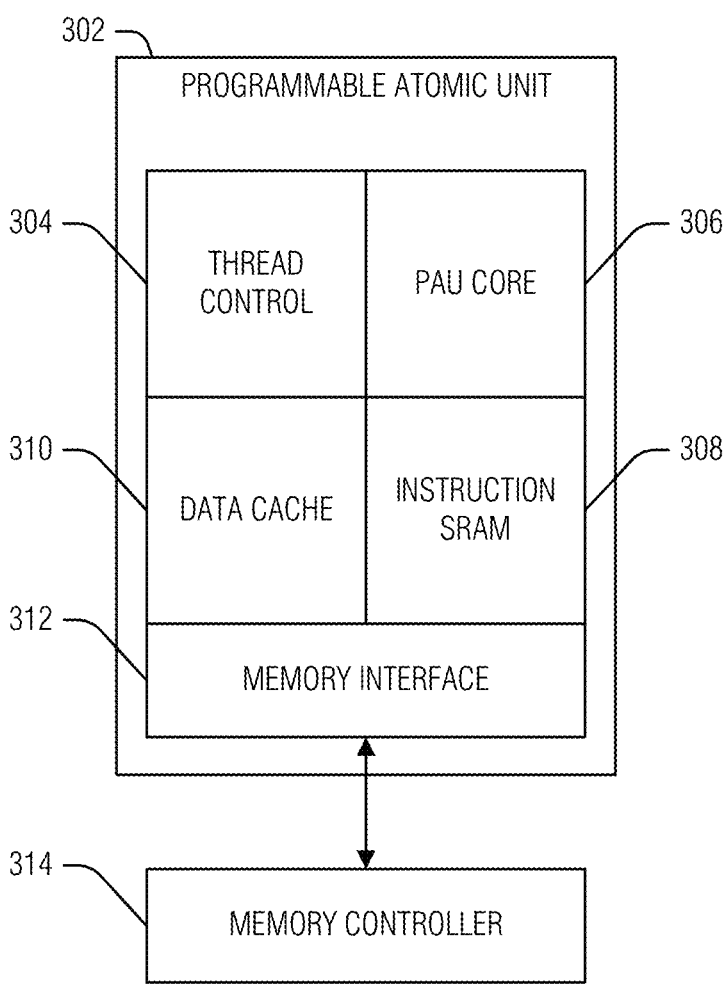
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) in memory local to the programmable atomic unit 302.

In an example, atomic operators manipulate the instruction SRAM 308, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the instruction SRAM 308 includes data for the requested memory address, the presence of the in-flight memory request makes it uncertain what the data in the instruction SRAM 308 at that address should be. Thus, the thread must wait for the in-flight memory request to be completed to operate on current data. The hazard is cleared when the memory request completes.

In an example, the hazard is a dirty cache line in the instruction SRAM 308 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the cache or instruction SRAM 308 inside the PAU. Thus, a memory request for a built-in atomic operator is processed from the cache or the off-die memory. If the cache line is dirty, then the built-in atomic operator will not be operating on the most current data until the cache is flushed to synchronize the cache and the other or off-die memories. This same situation could occur with other hardware blocks of the memory controller, such as cryptography block, encoder, etc.

The PAU core 306 can be configured to place a thread into a memory response path. Although the memory request of a thread was not issued, the thread can be largely handled as if the memory request was made. This enables a smooth rescheduling of the thread without impacting other threads and without adding thread stalling circuitry to the various pipeline stages of the PAU core 306. Two issues can arise with this approach. First, because a memory request was not actually issued, the thread can skip some stages of the memory request and response path. Second, because no memory response is coming, data will not be updated (e.g., there will be no register writeback) by the thread.

To address the first issue, the PAU core 306 can be configured to add the thread to a queue of threads awaiting insertion into the memory response path. Here, the PAU core 306 maintains the queue and pushes the thread onto the queue. In this way, the memory response path of the processor core can pop a next thread off the queue to place into the standard memory response path.

To address the second issue, the PAU core 306 is configured to provide an indicator that a register write-back will not occur for the thread. The indicator (e.g., flag) can be some bits added to the thread metadata in the queue, or elsewhere, to indicate that a write-back mechanism will not operate with respect to the thread in this instance. Thus, when the thread appears at a register file write block in the memory response path, no register file write will occur.

In an example, to provide the indicator that a register write-back will not occur for the thread, the PAU core 306 is configured to create a memory response that includes the indicator. Here, the way in which the thread is inserted into the memory response path is through a memory response manufactured by the PAU core 306 rather than from the memory controller 314. Thus, to the memory response path, a standard memory response is being handled for the thread. However, the inclusion of the indicator means that a register or cache write block will not perform any actions. In an example, the memory response is placed into the queue to await insertion into the memory response path after earlier stages in the memory response path, such as decode from the memory controller, error correction, etc.

The thread control 304 can be configured to reschedule a thread with other threads in a memory response path. In an example, the thread is popped from the queue of threads awaiting insertion into the memory response path. In an example, the indicator is processed by the memory response path to move the thread from the queue of threads awaiting a response from memory to a memory response reschedule queue in the memory response path. Here, the indicator, or other metadata, is used by the memory response path to determine a correct insertion time for the thread amongst other pending threads.

Figure 4:
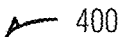
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406.

The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
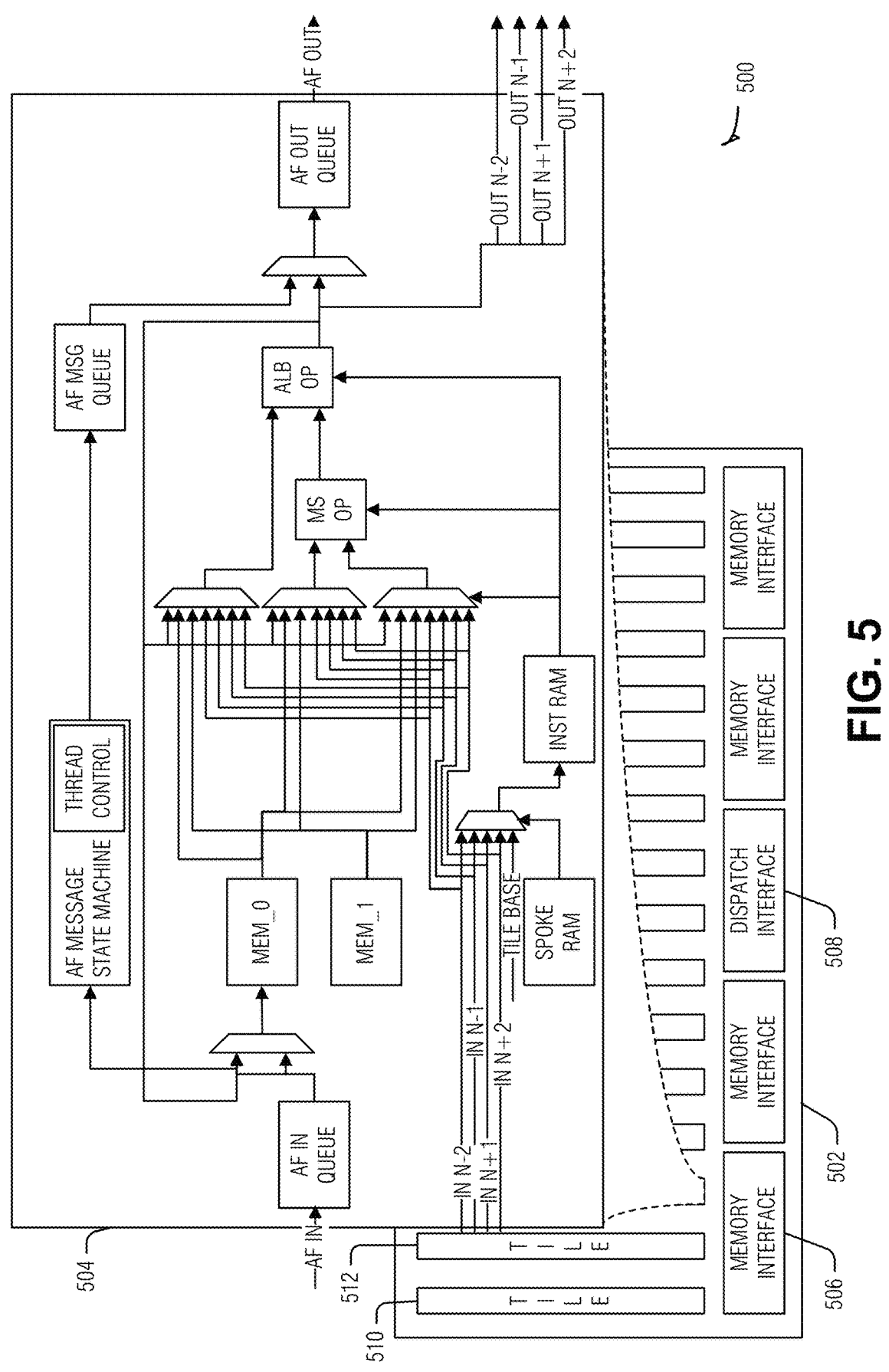
FIG. 5 illustrates an example of a representation of a hybrid threading fabric (HTF) of a memory-compute device, according to an embodiment.

FIG. 5 illustrates an example of a representation of a hybrid threading fabric (HTF), or HTF 500, of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can include one or more compute elements with local memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 5, the tiles comprising the HTF cluster 502 are linearly arranged, and each tile in the cluster can be coupled to one or multiple other tiles in the HTF cluster 502. In the example of FIG. 5, the example tile 504, or Tile N, is coupled to four other tiles, including to a base tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid or other configuration, with each tile similarly coupled to one or several of its nearest neighbors in the grid. Tiles that are provided at an edge of a cluster can optionally have fewer connections to neighboring tiles. For example, Tile N–2, or the base tile 510 in the example of FIG. 5, can be coupled only to the adjacent tile 512 (Tile N–1) and to the example tile 504 (Tile N). Fewer or additional inter-tile connections can similarly be used.

The HTF cluster 502 can further include memory inter-face modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 5, the tiles in the HTF cluster 502 are coupled using a synchronous fabric (SF). The synchro-nous fabric can provide communication between a particular tile and its neighboring tiles in the HTF cluster 502, as described above. Each HTF cluster 502 can further include an asynchronous fabric (AF) that can provide communica-tion among, e.g., the tiles in the cluster, the memory inter-faces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous domain pipeline in a tile, the control information can arrive at a tile a few clock cycles before the data field. Various registers can be provided to help coordi-nate dataflow timing in the pipeline.

In an example, each tile in the HTF cluster 502 can include multiple memories. Each memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous domain, or can include a result of a load operation such as initiated by another synchronous domain. The tile memory can be read via synchronous data path instruction execution in the synchronous domain.

In an example, each tile in an HTF cluster 502 can have a dedicated instruction RAM (INST RAM). In an example of an HTF cluster 502 with sixteen tiles, and instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory refer-ences to proceed in parallel with computation, thereby providing more efficient streaming kernels. In an example, the various tiles can include built-in support for loop-based constructs, and can support nested looping kernels.

The synchronous fabric can allow multiple tiles to be pipelined, such as without a need for data queuing. Tiles that participate in a synchronous domain can, for example, act as a single pipelined data path. A first or base tile (e.g., Tile N–2, in the example of FIG. 5) of a synchronous domain can initiate a thread of work through the pipelined tiles. The base tile can be responsible for starting work on a predefined cadence referred to herein as a Spoke Count. For example, if the Spoke Count is 3, then the base tile can initiate work every third clock cycle.

In an example, the synchronous domain comprises a set of connected tiles in the HTF cluster 502. Execution of a thread can begin at the domain's base tile and can progress from the base tile, via the synchronous fabric, to other tiles in the same domain. The base tile can provide the instruction to be executed for the first tile. The first tile can, by default, provide the same instruction for the other connected tiles to execute. However, in some examples, the base tile, or a subsequent tile, can conditionally specify or use an alterna-tive instruction. The alternative instruction can be chosen by having the tile's data path produce a Boolean conditional value, and then can use the Boolean value to choose between an instruction set of the current tile and the alternate instruc-tion.

The asynchronous fabric can be used to perform opera-tions that occur asynchronously relative to a synchronous domain. Each tile in the HTF cluster 502 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 502 can perform various compute operations for the HTF. The compute operations can be performed by configuring the data path within the tile. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Mul-tiply and Add, or a Shift and Add, among others.

In an example, each instance of a memory-compute device in a system can have a complete supported instruc-tion set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the base tile input) is the primary input for each clock cycle. The Spoke RAM read address input can originate at a counter that counts from zero to Spoke Count minus one. In an example, different spoke counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

FIG. 6A and FIG. 6B illustrate generally an example of a chiplet system that can be used to implement one or more aspects of the CNM system 102. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 6A and FIG. 6B illustrate generally an example of a chiplet system, according to an embodiment. FIG. 6A is a representation of the chiplet system 602 mounted on a peripheral board 604, that can be connected to a broader computer system by a peripheral component interconnect express (PCIe), for example. The chiplet system 602 includes a package substrate 606, an interposer 608, and four chiplets, an application chiplet 610, a host interface chiplet 612, a memory controller chiplet 614, and a memory device chiplet 616. Other systems can include many additional chiplets to provide additional functionalities as will be apparent from the following discussion. The package of the chiplet system 602 is illustrated with a lid or cover 618, though other packaging techniques and structures for the chiplet system can be used. FIG. 6B is a block diagram labeling the components in the chiplet system for clarity.

The application chiplet 610 is illustrated as including a chiplet system NOC 620 to support a chiplet network 622 for inter-chiplet communications. In example embodiments the chiplet system NOC 620 can be included on the application chiplet 610. In an example, the first NOC 118 from the example of FIG. 1 can be defined in response to selected support chiplets (e.g., host interface chiplet 612, memory controller chiplet 614, and memory device chiplet 616) thus enabling a designer to select an appropriate number or chiplet network connections or switches for the chiplet system NOC 620. In an example, the chiplet system NOC 620 can be located on a separate chiplet, or within the interposer 608. In examples as discussed herein, the chiplet system NOC 620 implements a chiplet protocol interface (CPI) network.

In an example, the chiplet system 602 can include or comprise a portion of the first memory-compute node 104 or the memory first memory-compute device 112. That is, the various blocks or components of the first memory-compute device 112 can include chiplets that can be mounted on the peripheral board 604, the package substrate 606, and the interposer 608. The interface components of the first memory-compute device 112 can comprise, generally, the host interface chiplet 612, the memory and memory control-related components of the first memory-compute device 112 can comprise, generally, the memory controller chiplet 614, the various accelerator and processor components of the first memory-compute device 112 can comprise, generally, the application chiplet 610 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 622. For example, the Advanced extensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 622.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 608. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 610, provides a sender, such as the memory controller chiplet 614, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 6A includes a chiplet mesh network 624 that uses a direct, chiplet-to-chiplet technique without a need for the chiplet system NOC 620. The chiplet mesh network 624 can be implemented in CPI, or another chiplet-to-chiplet protocol. The chiplet mesh network 624 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system can be through a desired interface (for example, a PCIe interface). Such an external interface can be implemented, in an example, through the host interface chiplet 612, which in the depicted example, provides a PCIe interface external to chiplet system. Such dedicated chiplet interfaces 626 are generally employed when a convention or standard in the industry has converged on such an interface. The illustrated example of a Double Data Rate (DDR) interface connecting the memory controller chiplet 614 to a dynamic random access memory (DRAM) memory device chiplet 616 is just such an industry convention.

Of the variety of possible support chiplets, the memory controller chiplet 614 is likely present in the chiplet system due to the near omnipresent use of storage for computer processing as well as sophisticated state-of-the-art for memory devices. Thus, using memory device chiplets 616 and memory controller chiplets 614 produced by others gives chiplet system designers access to robust products by sophisticated producers. Generally, the memory controller chiplet 614 provides a memory device-specific interface to read, write, or erase data. Often, the memory controller chiplet 614 can provide additional features, such as error detection, error correction, maintenance operations, or atomic operator execution. For some types of memory, maintenance operations tend to be specific to the memory device chiplet 616, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 614. In other chiplet systems, the atomic operators can be performed by other chiplets. For example, an atomic operator of "increment" can be specified in a command by the application chiplet 610, the command including a memory address and possibly an increment value. Upon receiving the command, the memory controller chiplet 614 retrieves a number from the specified memory address, increments the number by the amount specified in the command, and stores the result. Upon a successful completion, the memory controller chiplet 614 provides an indication of the command success to the application chiplet 610. Atomic operators avoid transmitting the data across the chiplet mesh network 624, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 614.

The memory device chiplet 616 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 616 as a chiplet, however, the device can reside elsewhere, such as in a different package on the peripheral board 604. For many applications, multiple memory device chiplets can be provided. In an example, these memory device chiplets can each implement one or multiple storage technologies, and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 614 can serve to coordinate operations between multiple memory chiplets in the chiplet system 602, for example, to use one or more memory chiplets in one or more levels of cache storage, and to use one or more additional memory chiplets as main memory. The chiplet system 602 can include multiple memory controller chiplet 614 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 7:
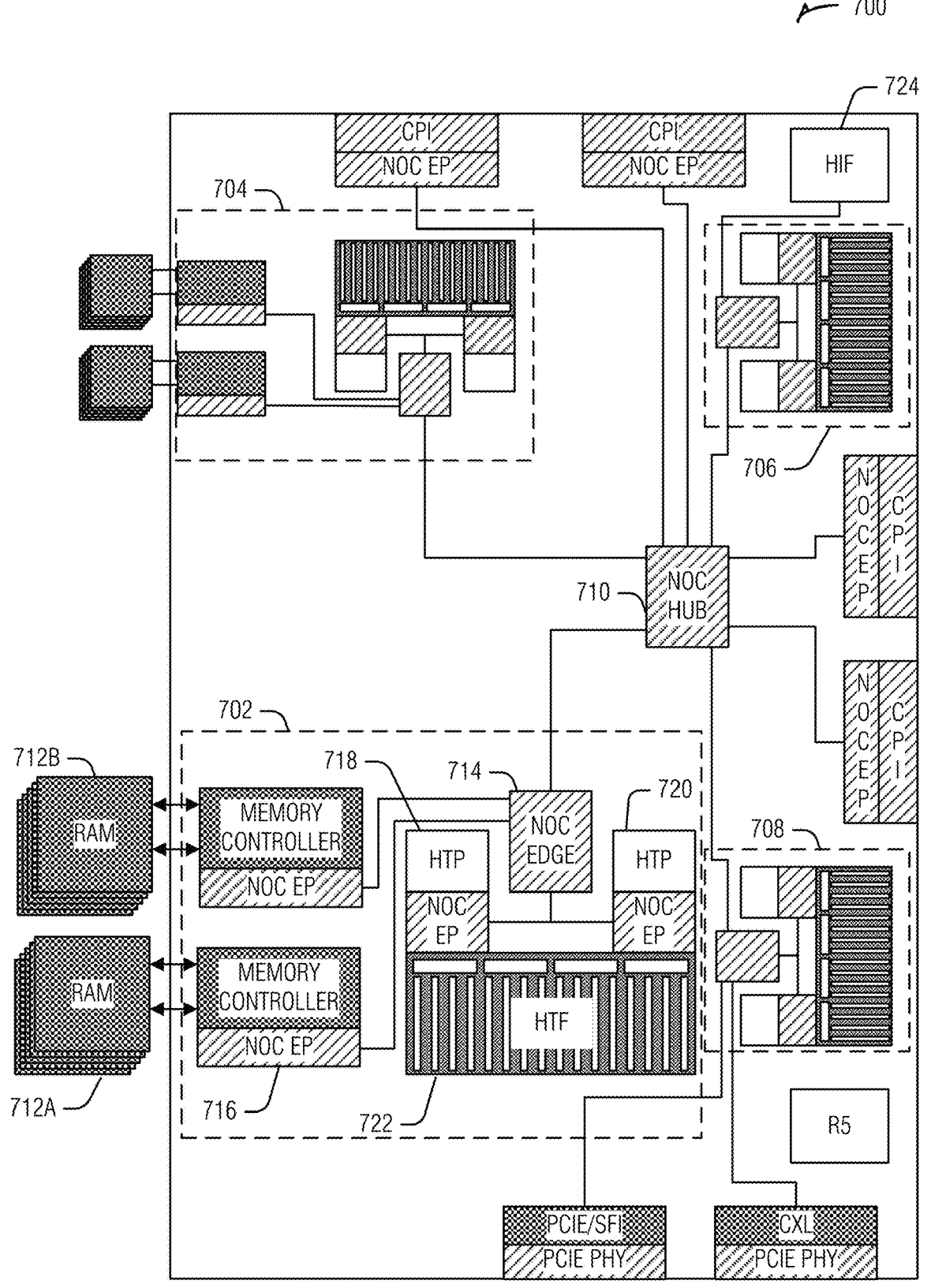
FIG. 7 illustrates generally an example of a chiplet-based implementation for a memory-compute device, according to an embodiment.

FIG. 7 illustrates generally an example of a chiplet-based implementation for a memory-compute device, according to an embodiment. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 602 from FIG. 6A and FIG. 6B.

The example of FIG. 7 includes a first CNM package 700 comprising multiple chiplets. The first CNM package 700 includes a first chiplet 702, a second chiplet 704, a third chiplet 706, and a fourth chiplet 708 coupled to a CNM NOC hub 710. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 7, the first chiplet 702 includes a first NOC hub edge 714 coupled to the CNM NOC hub 710. The other chiplets in the first CNM package 700 similarly include NOC hub edges or endpoints. The switches in the NOC hub edges facilitate intra-chiplet, or intra-chiplet-system, communications via the CNM NOC hub 710.

The first chiplet 702 can further include one or multiple memory controllers 716. The memory controllers 716 can correspond to respective different NOC endpoint switches interfaced with the first NOC hub edge 714. In an example, the memory controller 716 comprises the memory controller chiplet 614 or comprises the memory controller 130, or comprises the memory subsystem 200, or other memory-compute implementation. The memory controllers 716 can be coupled to respective different memory devices, for example including a first external memory module 712A or a second external memory module 712B. The external memory modules can include, e.g., GDDR6 memories that can be selectively accessed by the respective different chiplets in the system.

The first chiplet 702 can further include a first HTP chiplet 718 and second HTP chiplet 720, such as coupled to the first NOC hub edge 714 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 722.

The HTF chiplet 722 can correspond to an HTF accelerator, such as the HTF 142 from the example of FIG. 1, or the HTF 500 from the example of FIG. 5.

The CNM NOC hub 710 can be coupled to NOC hub instances in other chiplets or other CNM packages by way of various interfaces and switches. For example, the CNM NOC hub 710 can be coupled to a CPI interface by way of multiple different NOC endpoints on the first CNM package 700. Each of the multiple different NOC endpoints can be coupled, for example, to a different node outside of the first CNM package 700. In an example, the CNM NOC hub 710 can be coupled to other peripherals, nodes, or devices using CTCPI or other, non-CPI protocols. For example, the first CNM package 700 can include a PCIe scale fabric interface (PCIE/SFI) or a CXL interface (CXL) configured to interface the first CNM package 700 with other devices. In an example, devices to which the first CNM package 700 is coupled using the various CPI, PCIe, CXL, or other fabric, can make up a common global address space.

In the example of FIG. 7, the first CNM package 700 includes a host interface 724 (HIF) and a host processor (R5). The host interface 724 can correspond to, for example, the HIF 120 from the example of FIG. 1. The host processor, or R5, can correspond to the internal host processor 122 from the example of FIG. 1. The host interface 724 can include a PCI interface for coupling the first CNM package 700 to other external devices or systems. In an example, work can be initiated on the first CNM package 700, or a tile cluster within the first CNM package 700, by the host interface 724. For example, the host interface 724 can be configured to command individual HTF tile clusters, such as among the various chiplets in the first CNM package 700, into and out of power/clock gate modes.

Figure 8:
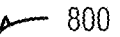
FIG. 8 illustrates an example tiling of memory-compute device chiplets, according to an embodiment.

FIG. 8 illustrates an example tiling of memory-compute devices, according to an embodiment. In FIG. 8, a tiled chiplet example 800 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 800 includes, as one or multiple of its compute-near-memory (CNM) clusters, instances of the first CNM package 700 from the example of FIG. 7. For example, the tiled chiplet example 800 can include a first CNM cluster 802 that includes a first chiplet 810 (e.g., corresponding to the first chiplet 702), a second chiplet 812 (e.g., corresponding to the second chiplet 704), a third chiplet 814 (e.g., corresponding to the third chiplet 706), and a fourth chiplet 816 (e.g., corresponding to the fourth chiplet 708). The chiplets in the first CNM cluster 802 can be coupled to a common NOC hub, which in turn can be coupled to a NOC hub in an adjacent cluster or clusters (e.g., in a second CNM cluster 804 or a fourth CNM cluster 808).

In the example of FIG. 8, the tiled chiplet example 800 includes the first CNM cluster 802, the second CNM cluster 804, a third CNM cluster 806, and the fourth CNM cluster 808. The various different CNM chiplets can be configured in a common address space such that the chiplets can allocate and share resources across the different tiles. In an example, the chiplets in the cluster can communicate with each other. For example, the first CNM cluster 802 can be communicatively coupled to the second CNM cluster 804 via an inter-chiplet CPI interface 818, and the first CNM cluster 802 can be communicatively coupled to the fourth CNM cluster 808 via another or the same CPI interface. The second CNM cluster 804 can be communicatively coupled to the third CNM cluster 806 via the same or other CPI interface, and so on.

In an example, one of the compute-near-memory chiplets in the tiled chiplet example 800 can include a host interface (e.g., corresponding to the host interface 724 from the example of FIG. 7) that is responsible for workload balancing across the tiled chiplet example 800. The host interface can facilitate access to host-based command request queues and response queues, such as from outside of the tiled chiplet example 800. The host interface can dispatch new threads of execution using hybrid threading processors and the hybrid threading fabric in one or more of the compute-near-memory chiplets in the tiled chiplet example 800.

A thread is started on the HTP accelerator when a CPI or CTCPI call packet is received and processed by the accelerator. A CPI or CTCPI call packet can originate from either the host interface (HIF) or an HTP accelerator. Calls originating from the HIF are issued by a host processor and are defined as a master thread. Calls that originate from an HTP are defined as a fiber thread. The major differences between master and fiber threads have to do with the restrictions of creating new fibers.

Note that stack memory for all threads is pre-allocated when the application running on the host processor makes a system call indicating it needs to have access to HTP resources. Thereafter, when a thread is started on an HTP context the pre-allocated stack is available for use. The stack size for master threads and stack size for fibers can be different. Normally master threads have larger stack size than fibers.

An HTP thread can execute a thread create (e.g., ETC or XTC) instruction to initiate a thread on an accelerator resource. Accelerator resources include HTP and HTF as well as generic accelerators. The generic accelerators allow interacting with accelerators that are not yet defined.

The thread create instruction specifies the information that will be returned when the created thread completes. Before a thread can be created, space for the returned information must be reserved. When a thread eventually completes, the thread writes its return information into the reserved space and waits for the parent thread to execute a thread join instruction. The thread join instruction takes the returned information from the reserved space and transfers it to the thread's X register state for later usage by the parent thread. Once the thread is joined, then the reserved space is released.

A thread create instruction can indicate that no return information is returned on completion of the created thread. This indication allows an HTP accelerator to create the thread without reserving space for return information. In this case, a counter is used to keep track of the number of outstanding threads with no return information.

A parent thread executes a join instruction (e.g., EFJ, EFJA, XFJ, XFJA) to determine if a child has completed and to obtain returned results. All accelerator resources (HTP, HTF, and generic) use this common approach of returning thread completion status to the initiating parent thread. The returned state from a child thread may include: caller ID and 0, 1 or 2 64-bit return parameters. Threads may be created with the no return (nr) specified.

The fiber join instruction (e.g., EFJ or XFJ) joins threads that were created without the no return indication and ignores threads that were created with the no return indication. The fiber join instruction processes a single completed child thread and writes the returned call ID and parameters to thread X registers for access by the parent thread.

The Fiber Create instruction (e.g., EFC or XFC) initiates a thread on a hybrid threaded accelerator (HTA). Up to four HTAs can exist within a CNM device including HTP and HTF.

Fiber create instructions are illustrated in FIG. 9. FIG. 9 illustrates an EFC/XFC instruction set 900. It is understood that other instruction sets may be used. Bits 0-6 are the opcode that specifies the EFC/XFC function and bits 27-31 are the function code that distinguish the EFC/XFC types (e.g., HTA0, HTA1, HTA0H.BF, etc.). The bit fields of bits 7-11, 15-19, and 20-24 are reserved bits for future use.

The EFC/XFC instructions specify several parameters for a fiber create operation. The Return Argument Count (rc) field may take the values (NR, 0, 1, 2). In an example, an HTP can create a thread on an accelerator resource when the calling HTP has space to hold the return information. The return information includes both the Caller ID and up to two 64-bit return values. The fiber create instruction specifies the storage space required for the return information. The return information suffix options are NR, R0, R1 and R2. The NR suffix implies that no return information is to be stored (i.e., the join instruction will not provide any information). The R0 suffix implies that the caller ID will be available for a join instruction. The R1 and R2 suffixes imply that either one or two 64-bit return arguments in addition to the caller ID will be stored and available for a join instruction.

The return information storage is allocated when the fiber create instruction is executed. If insufficient return information space is available, then the fiber create instruction is paused until space becomes available. Fiber create instructions with the NR suffix requires no return information storage and the number outstanding is limited to the size of a counter to track the number outstanding. The R0 suffix requires storage for the caller ID but no return values, and the R1 and R2 require both caller ID and return value space. The more information a set of created fibers requires results in smaller maximum outstanding fibers.

A busy fail version of the EFC instruction is provided to allow an accelerator resource dispatcher to fail the EFC instruction if supported.

The HTP dispatcher supports busy fail and will return failing status if an HTP context is not available on the target CNM device. The status of the fiber create instruction is written to X register A0.

The HTF dispatcher does not support busy fail and will pause the EFC/XFC instruction until the dispatcher is able to find an HTF to start the created thread. Other accelerator resource dispatchers may choose to support busy fail or not. Once the EFC/XFC instruction completes, the thread continues at the instruction immediately following the EFC/XFC instruction.

Note that master threads (i.e., threads created by a host) may execute any of the defined EFC/XFC instructions. HTP fiber threads (i.e., threads created by an HTP) may execute a busy fail type of EFC/XFC instruction or an EFC/XFC targeted at a non-HTP accelerator resource. A trap will result if a fiber attempts to execute a non-busy fail HTP fiber create.

Threads may be created on an accelerator, such as an HTP 140 or HTF 142. In this document, a thread may refer to a system or host thread, while a "fiber" may refer to a thread created at the HTP 140 or HTF 142. In other words, host-dispatched work to HTP accelerators is referred to as master threads, and HTP-dispatched work to an HTP accelerator is referred to as a fiber thread. In many cases, the term "fiber thread" is interchangeable with the term "thread."

Multiple types of threads are supported by the HTP and HTF architecture. A thread may be designed as a return or "no return" type of thread. If the thread is of a return type, the fiber create instruction specifies the storage space for the return information. If the thread is a "no return" type of thread, then no return information storage is necessary, and the only limitation is the maximum number of available threads in the system.

A busy fail instruction feature is provided to allow an accelerator resource dispatcher to fail the thread creation instruction. The HTP dispatcher supports busy fail and will return a failing status if an HTP context is not available on the target memory-compute system. Using this failing status, a thread or fiber that attempts to spawn a child fiber to work on some of a workload is able to determine whether to continue processing a workload or divide the workload and assign a portion of the divided workload to a spawned fiber. This is described in more detail below.

As described above with respect to FIG. 3, a PAU processor or PAU core 306, may be implemented as a barrel processor or a barrel-multithreaded processor. In such an implementation, the PAU processor 306 is a pipelined processor with multiple stages in the pipeline.

Figure 10:
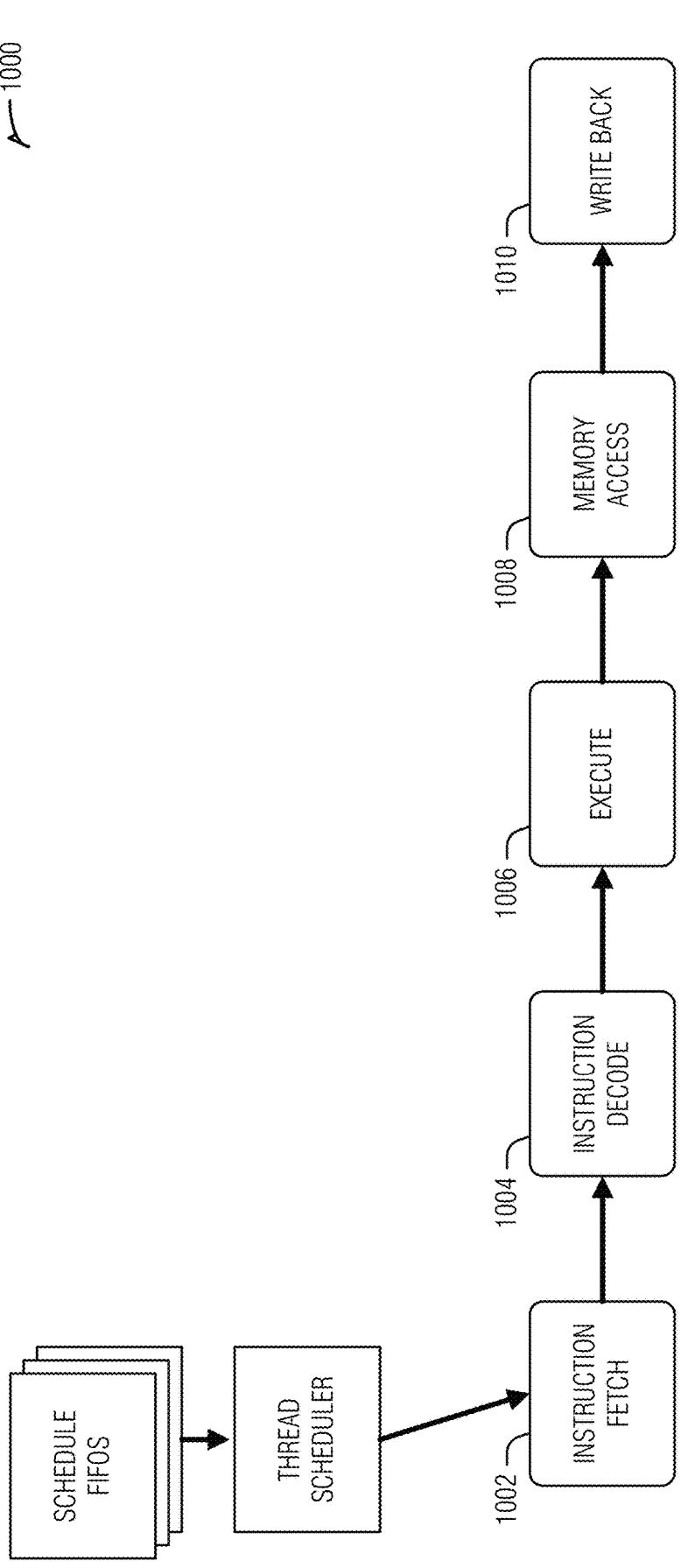
FIG. 10 illustrates a reduced instruction set computer (RISC) barrel processor pipeline, according to an embodiment.

FIG. 10 illustrates a reduced instruction set computer (RISC) barrel processor pipeline 1000 including the stages of instruction fetch (IF) 1002, instruction decode (ID) 1004, execute (EX) 1006, memory request (MA) 1008, and write-back (WB) 1010. It is understood that the pipeline 1000 illustrated in FIG. 10 is non-limiting and that pipelines that the PAU processor 306 may be more complex, such as in a complex instruction set computer (CISC) pipeline. Additional stages may be used to perform sub-computations, manage microinstructions, merge operations, instruction re-ordering or scheduling operations, instruction parallelization operations, and the like.

In the IF stage 1002, the current instruction associated with the thread is read from instruction memory (e.g., instruction SRAM 308). The instruction memory may be dedicated SRAM or an instruction cache. The instruction fetch operation takes one clock cycle. This assumes that the instruction was in the instruction cache or that the SRAM is a single-cycle SRAM. The instruction may be a 32-bit or 64-bit instruction, for example. In the IF stage 1002, a program counter (PC) may be incremented to access the next instruction to be processed in the pipeline 1000.

In the next clock cycle, the instruction is moved to the next stage and decoded in the ID stage 1004. In the ID stage 1004, the instruction is decoded into various control signals indicating the operation and index locations of operands (typically registers). The operation may be of any type, including arithmetic operations (e.g., add, subtract, multiply, divide, etc.), Boolean operations (e.g., AND, OR, XOR, etc.), bit operations (e.g., bit shift, etc.), data operations (e.g., move, copy, load, store, etc.), program control flow (e.g., branch, jump, return, no operation (NOP), etc.) or the like. The indexes of the registers are used to retrieve operand values or addresses from the register file.

At the same time the register file is read, logic in the ID stage 1004 determines branch conditions and whether the instruction is ready to execute. Branching causes the instruction at the branch location to be placed into the pipeline instead of the instruction at the PC. Other types of branch handling are considered to be within the scope of this discussion.

In the EX stage 1006, the instruction is executed. For instance, a mathematical operation may execute on operand values read from registers. Typically, the EX stage 1006 includes use of one or more arithmetic logic units (ALUs) and a bit shifter (used for shifts and rotations). The EX stage 1006 may also use multiplier or divider logic. The ALU is responsible for performing Boolean operations and integer addition and subtraction. Besides the calculated result, the ALU typically provides status bits, such as whether or not the result was 0 or if an overflow occurred.

Operations during the EX stage 1006 may be performed in a single cycle or may use multiple cycles, depending on the type of operation and whether memory is accessed. For instance, simple operations such as add, subtract, compare, and logical operations on values that are in registers may be performed in a single cycle. However, complex integer multiplication and division, and all floating point operations may require more than one cycle.

In the MA stage 1008, the data cache may be accessed for reads from memory (e.g., random-access memory or storage, such as a hard drive). In an example, two SRAMs are used: one as the data cache and one as the tag memory. Tag memory (i.e., tag RAM) is used to store metadata about cache lines in the data cache. When checking to see if data is in the data cache, the values stored in the tag RAM determine whether a cache lookup is a hit or a miss. Additionally, during the MA stage 1008, the thread state may be stored in an execution register.

Threads that do not have to access the data cache or memory may have their state forwarded through the MA stage 1008. For instance, a thread that is sending a message to another PAU processor over a fabric may not interact with the local data cache or memory. However, such an instruction is processed through the entire pipeline.

Threads progressing through the pipeline 1000 may experience various structural hazards. In general, hazards come in various types including structural hazards, data hazards, and control hazards. A structural hazard occurs one when a hardware resource is needed by two or more instructions at the same time. A data hazard occurs when one instruction is dependent on another instruction's output. The two instructions are unable to execute in parallel because the later instruction would use attempt to use data before it is modified by the earlier instruction. A control hazard occurs when the wrong instruction is prefetched into the pipeline and must be discarded. The mechanisms described herein are generally used to manage structural hazards.

A non-exclusive list of structural hazards that may be handled by the hazard management circuitry is provided here.

Memory Load Hazard: Waiting for a memory load response to arrive to fill the data cache.

Instruction Cache Load Hazard: Waiting for a memory load response to arrive to fill the instruction cache.

Store—Read-After-Write (RAW) Hazard: Logic governing RAW Hazards cannot accept another store, wait for an existing store to complete.

Load—Read-After-Write Hazard: Potential load while a store request is outstanding for the same memory, wait for existing stores to complete.

Store—Credit Hazard: No credit available for a store operation, wait for existing stores to drain from the output queue and return credits.

Event—Credit Hazard: No credit available for an event operation, wait for existing events to drain from the output queue and return credits.

Store—Outstanding Count Overflow Hazard: Logic governing outstanding store counts cannot accept another store, wait for an existing store to complete.

Floating Point Hazard: An operation required accessing floating point logic which executes asynchronously to the processor, wait for operation completion.

Store—Outstanding Count Hazard: An operation requires all outstanding stores to quiesce and there are outstanding stores, wait for all existing stores to complete.

XFJ—Fiber Join Wait Hazard: An operation is attempting to join a child thread but no child is available and ready to join, wait until a thread returns and is joinable.

XFJA—Fiber Join All Wait Hazard: An operation is attempting to join all child threads but not all children are available and ready to join, wait until all threads return and are joinable.

Event Listen Wait Hazard: An operation is attempting to receive an event (thread-thread message) and no message is available, wait until such a message is available.

Call Hazard: An operation attempted to initiate a child thread on another processor and must wait to see the success/fail status of the thread creation before continuing execution. Success/Fail status is signaled by a future message to this processor from the load balancer.

System Call Hazard: An operation attempted to execute a system call back to the host processor and must wait for completion of the execution of that system call before continuing. Success/Fail status is signaled by a future message to this processor from the host.

Event Hazard: An operation attempted to send a thread-thread message to another thread and must wait to see the success/fail status of the message before continuing execution. Success/Fail status is signaled by a future message to this processor from the load balancer.

Hazards may be detected by memory controllers, event controllers, thread schedulers, or by other circuits, controllers, or mechanisms. In conventional systems, when a hazard is identified, detected, or known to exist, the pipeline may be stalled by inserting bubbles (e.g., NOP operations) or the instruction may be rescheduled.

In the present system, when a structural hazard occurs, where an internal request is unable to be made due to a transient issue, such as one that was not predictable by software or a compiler, the instruction may be parked in a storage managed by the hazard management circuitry instead of having to be recycled back to the beginning of the pipeline 1000 or delaying the whole pipeline (stalling). This reduces scheduling overhead and unnecessary processing, instead providing the instruction a way to quiesce until the hazard is cleared.

Instructions that encounter hazards (e.g., including other than memory-based hazards) may be parked in the hazard storage. After the hazard is cleared, the instruction is released to the front of the pipeline to be rescheduled by the scheduler. As such, in the present systems and methods, instead of automatically rescheduling the instruction at the head of the pipeline when a hazard is encountered, the instruction is parked in a storage (i.e., a "hazard storage"). When the hazard clears, a signal is provided to the hazard management circuitry and the instruction is released to be rescheduled at the front of the pipeline.

Figure 11:
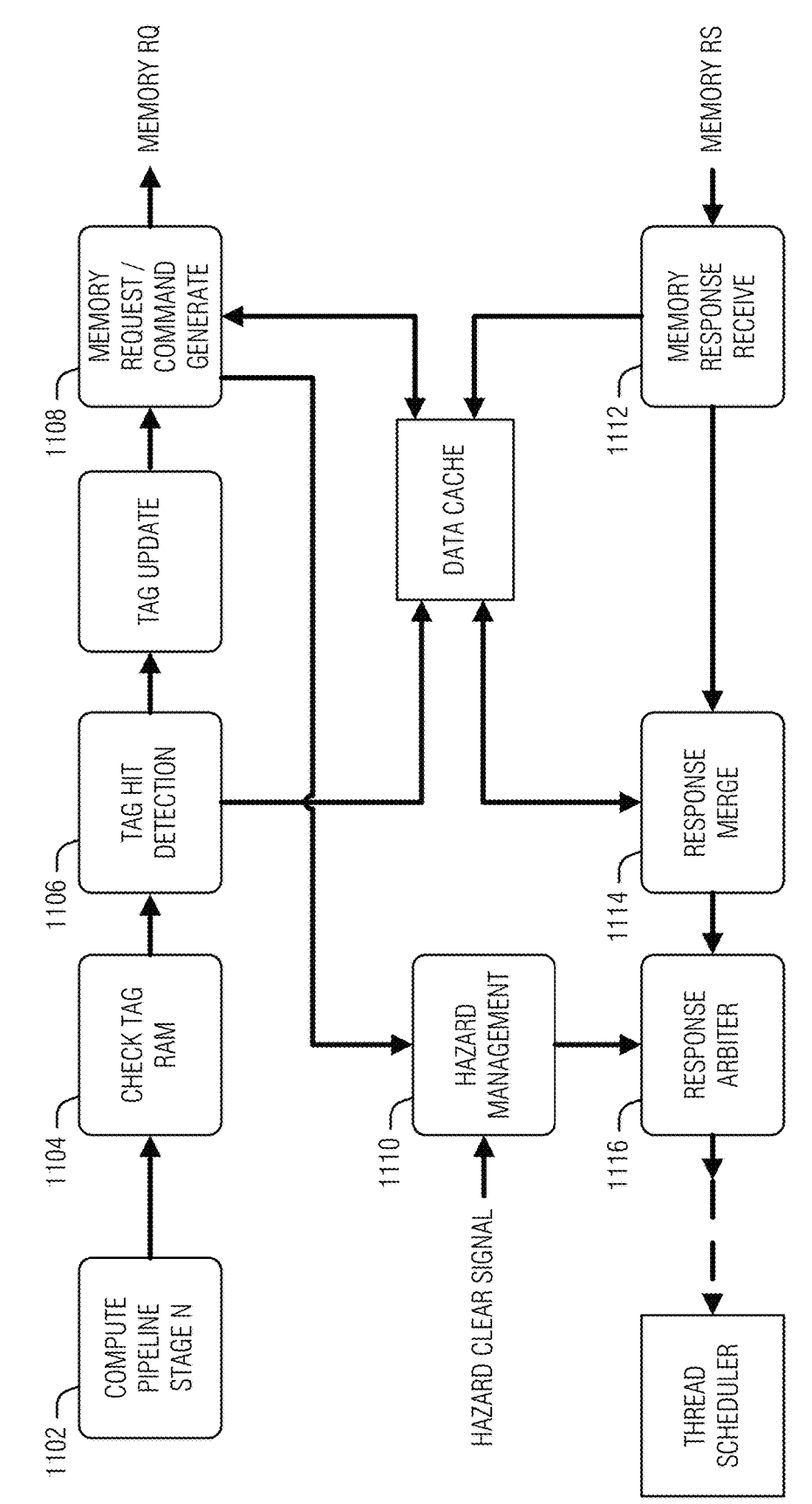
FIG. 11 illustrates a portion of a pipeline that includes stages and structures used to manage hazards, according to an embodiment.

FIG. 11 illustrates a portion of a pipeline 1100 that includes stages and structures used to manage hazards, according to an embodiment. After some compute pipeline stage N 1102, a hazard is detected and an instruction is placed into a hazard storage handled by a hazard management circuitry 1110. The hazard storage may be used to store a thread state or a hazard type, along with data.

In the example illustrated in FIG. 11, a thread instruction completes compute pipeline stage N 1102 and then proceeds to read the tag RAM (stage 1104), determine whether there was a cache hit in the tag hit detection stage 1106, and generate a memory request (stage 1108). It is understood that if the instruction does not include a memory access, such as a thread create instruction or a thread join instruction, the instruction is forwarded through these stages. At the generate memory request stage 1108, the pipeline determines that a hazard exists for the instruction.

For example, a Load RAW Hazard is detected by specific logic that checks for a dangerous read-after-write (RAW) condition on a load operation by examining the address of the load while it travels through the memory request logic (e.g., at stage 1108).

In another example, the Call Hazard is detected by logic observing that the request in the memory request logic is requesting that a Call be made on behalf of the thread. By its very nature, this Call must wait for positive/negative delivery confirmation before the thread is allowed to continue executing, therefore it automatically inherits the Call Hazard when in stage 1108.

Upon determining that a hazard exists, the instruction is stored in a hazard memory handled by a hazard management circuitry 1110. The instruction may be stored with its state, a hazard type, and other information. Hazards are cleared asynchronously to the pipeline. Once a hazard clears, a signal is driven to the hazard management circuitry 1110. The signal may include a hazard type so that the hazard management circuitry 1110 is able to release only those instructions that were suspended based on a certain hazard type. Alternatively, the signal may be a non-specific, general, or generic signal and the hazard management circuitry 1110 may release all instructions that are being temporarily stored in the hazard memory. Any instructions that are released are sent on the memory response bus, back to the scheduler.

The memory response pathway includes a memory response receive stage 1112, which receives the response from the memory request and interrogates the data cache. The response merge stage 1114 integrates clean data from memory with dirty data that is in the data cache line. Instructions may be routed through a response arbiter 1116, which arbitrates communication to the thread scheduler between the thread hazard management circuitry 1110 and the memory response pathway. In an embodiment, the response arbiter 1116 handles merging the thread state of the instruction with data updates to the data cache.

Returning to FIG. 10, in the WB stage 1010, for instructions that have proceeded through the MA stage 1008 successfully, the result of the instruction's operation may be written to the destination register in the register file. During this stage, both single-cycle and two-cycle instructions write their results into the register file. There may be two stages accessing the register file simultaneously—the ID stage 1004 to read one or more source registers and the WB stage 1010 to write to a destination register.

Figure 12:
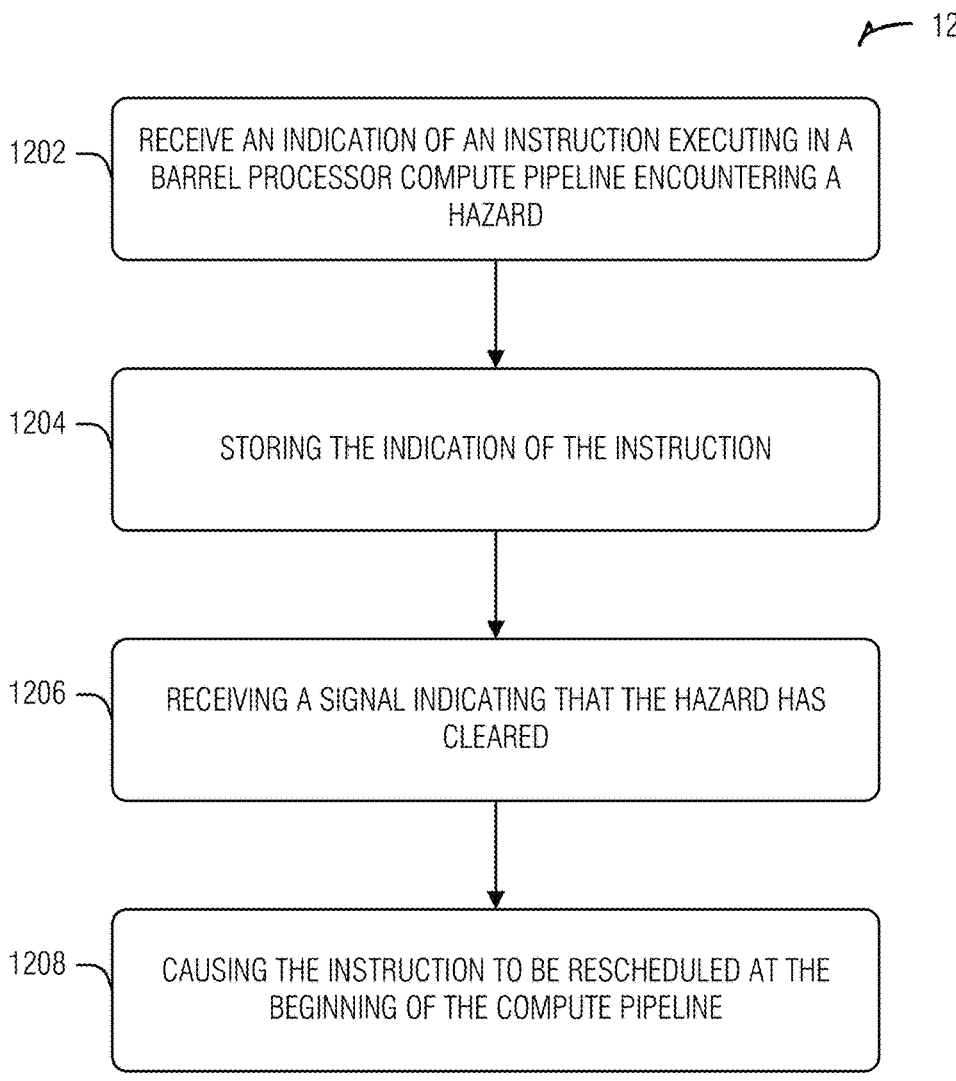
FIG. 12 is a flow chart of an example of a method for thread scheduling, according to an embodiment.

FIG. 12 is a flow chart of an example of a method 1200 for thread scheduling, according to an embodiment. Operations of the method 1200 are performed by computer hardware, such as that described with respect to FIGS. 1-8 (e.g., host system 108, host processor 122, PAU thread control 304, HTP core 402, thread controller 412, or dispatch interface 414) or FIG. 13 (e.g., processing circuitry).

At 1202, the method 1200 includes the operation to receive an indication of an instruction executing in a compute pipeline of a barrel processor, the instruction having encountered a hazard and unable to progress through the compute pipeline. The indication of the instruction may be a thread identifier.

At 1204, the method 1200 includes the operation to store the indication of the instruction in a hazard memory.

At 1206, the method 1200 includes the operation to receive a signal indicating that the hazard has cleared.

At 1208, the method 1200 includes the operation to cause the instruction to be rescheduled at the beginning of the compute pipeline in response to the signal.

In an embodiment, the method 1200 includes removing the indication of the instruction from the hazard memory after causing the instruction to be rescheduled.

In an embodiment, the method 1200 includes storing a state of the instruction. In a further embodiment, the method 1200 includes storing a type of hazard corresponding to the indication of the instruction. In various embodiments, the type of hazard is a memory store hazard, a memory load hazard, a fiber join hazard, a call hazard, an event listen hazard, or a return hazard.

In an embodiment, the signal indicating that the hazard has cleared includes the type of hazard. In such an embodiment, the operations causing the instruction to be rescheduled at the beginning of the compute pipeline in response to the signal include causing instructions of the type of hazard to be rescheduled at the beginning of the compute pipeline.

In another embodiment, the signal indicating that the hazard has cleared does not include the type of hazard. In such an embodiment, the method 1200 may include causing all instructions stored in the hazard memory to be rescheduled at the beginning of the compute pipeline.

In an embodiment, the hazard management circuitry is integrated in the barrel processor, and the barrel processor is included in a programmable atomic unit. In a further embodiment, the programmable atomic unit included in a memory controller. In a further embodiment, the memory controller is a chiplet in a chiplet system.

In an embodiment, the barrel processor is a hybrid threading processor.

Figure 13:
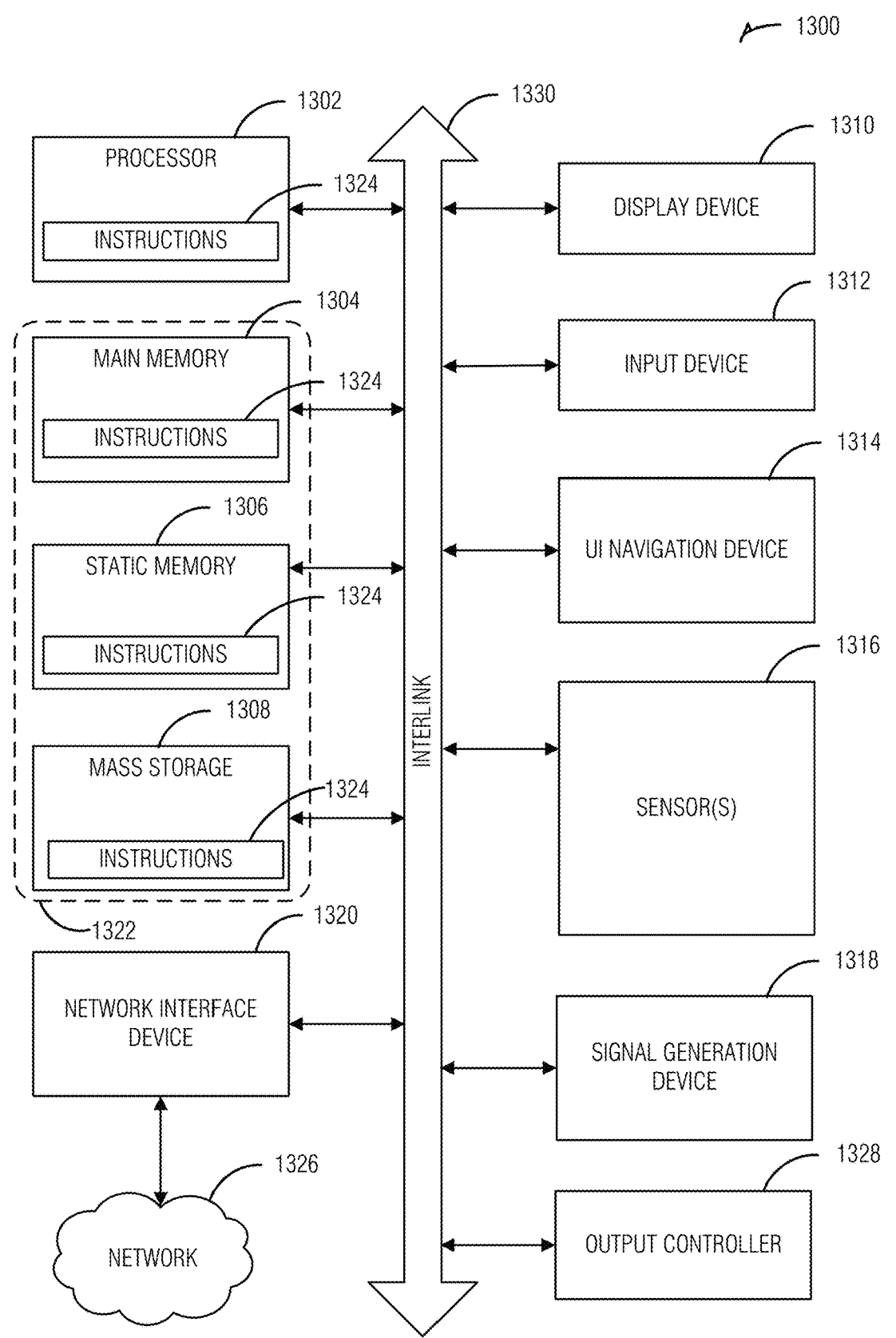
FIG. 13 illustrates a block diagram of an example machine with which, in which, or by which any one or more of the techniques (e.g., methodologies) discussed herein can be implemented.

FIG. 13 illustrates a block diagram of an example machine 1300 with which, in which, or by which any one or more of the techniques (e.g., methodologies) discussed herein can be implemented. Examples, as described herein, can include, or can operate by, logic or a number of components, or mechanisms in the machine 1300. Circuitry (e.g., processing circuitry) is a collection of circuits implemented in tangible entities of the machine 1300 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1300.

In alternative embodiments, the machine 1300 can operate as a standalone device or can be connected (e.g., networked) to other machines. In a networked deployment, the machine 1300 can operate in the capacity of a server machine, a client machine, or both in server-client network environments. In an example, the machine 1300 can act as a peer machine in peer-to-peer (P2P) (or other distributed) network environment. The machine 1300 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1300 (e.g., computer system) can include a hardware processor 1302 (e.g., a central processing unit (CPU), a graphics processing unit (GPU), a hardware processor core, or any combination thereof), a main memory 1304, a static memory 1306 (e.g., memory or storage for firmware, microcode, a basic-input-output (BIOS), unified extensible firmware interface (UEFI), etc.), and mass storage device 1308 (e.g., hard drives, tape drives, flash storage, or other block devices) some or all of which can communicate with each other via an interlink 1330 (e.g., bus). The machine 1300 can further include a display device 1310, an alphanumeric input device 1312 (e.g., a keyboard), and a user interface (UI) Navigation device 1314 (e.g., a mouse). In an example, the display device 1310, the input device 1312, and the UI navigation device 1314 can be a touch screen display. The machine 1300 can additionally include a mass storage device 1308 (e.g., a drive unit), a signal generation device 1318 (e.g., a speaker), a network interface device 1320, and one or more sensor(s) 1316, such as a global positioning system (GPS) sensor, compass, accelerometer, or other sensor. The machine 1300 can include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1302, the main memory 1304, the static memory 1306, or the mass storage device 1308 can be, or include, a machine-readable media 1322 on which is stored one or more sets of data structures or instructions 1324 (e.g., software) embodying or used by any one or more of the techniques or functions described herein. The instructions 1324 can also reside, completely or at least partially, within any of registers of the hardware processor 1302, the main memory 1304, the static memory 1306, or the mass storage device 1308 during execution thereof by the machine 1300. In an example, one or any combination of the hardware processor 1302, the main memory 1304, the static memory 1306, or the mass storage device 1308 can constitute the machine-readable media 1322. While the machine-readable media 1322 is illustrated as a single medium, the term "machine-readable medium" can include a single medium or multiple media (e.g., a centralized or distributed database, or associated caches and servers) configured to store the one or more instructions 1324.

The term "machine readable medium" can include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1322 can be representative of the instructions 1324, such as instructions 1324 themselves or a format from which the instructions 1324 can be derived. This format from which the instructions 1324 can be derived can include source code, encoded instructions (e.g., in compressed or encrypted form), packaged instructions (e.g., split into multiple packages), or the like. The information representative of the instructions 1324 in the machine-readable media 1322 can be processed by processing circuitry into the instructions to implement any of the operations discussed herein. For example, deriving the instructions 1324 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1324.

In an example, the derivation of the instructions 1324 can include assembly, compilation, or interpretation of the information (e.g., by the processing circuitry) to create the instructions 1324 from some intermediate or preprocessed format provided by the machine-readable media 1322. The information, when provided in multiple parts, can be combined, unpacked, and modified to create the instructions 1324. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1324 can be further transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 can include one or more physical jacks (e.g., Ethernet, coaxial, or phone jacks) or one or more antennas to connect to the network 1326. In an example, the network interface device 1320 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is an apparatus comprising: a barrel processor, comprising: hazard management circuitry; wherein the barrel processor is configured to perform operations through use of the hazard management circuitry to: receive an indication of an instruction executing in a compute pipeline of the barrel processor, the instruction having encountered a hazard and unable to progress through the compute pipeline; store the indication of the instruction in a hazard memory; receive a signal indicating that the hazard has cleared; and cause the instruction to be rescheduled at the beginning of the compute pipeline in response to the signal.

In Example 2, the subject matter of Example 1 includes, wherein the barrel processor is configured to detect the hazard.

In Example 3, the subject matter of Examples 1-2 includes, wherein the barrel processor is configured to perform operations through use of the hazard management circuitry to remove the indication of the instruction from the hazard memory.

In Example 4, the subject matter of Examples 1-3 includes, wherein the hazard memory is configured to store a state of the instruction.

In Example 5, the subject matter of Examples 1-4 includes, wherein the hazard memory is configured to store a type of hazard corresponding to the indication of the instruction.

In Example 6, the subject matter of Example 5 includes, wherein the type of hazard is a memory store hazard.

In Example 7, the subject matter of Examples 5-6 includes, wherein the type of hazard is a memory load hazard.

In Example 8, the subject matter of Examples 5-7 includes, wherein the type of hazard is a fiber join hazard.

In Example 9, the subject matter of Examples 5-8 includes, wherein the type of hazard is a call hazard.

In Example 10, the subject matter of Examples 5-9 includes, wherein the type of hazard is an event listen hazard.

In Example 11, the subject matter of Examples 5-10 includes, wherein the type of hazard is a return hazard.

In Example 12, the subject matter of Examples 5-11 includes, wherein the signal indicating that the hazard has cleared includes the type of hazard.

In Example 13, the subject matter of Example 12 includes, wherein to cause the instruction to be rescheduled at the beginning of the compute pipeline in response to the signal, the hazard management circuitry is configured to cause instructions of the type of hazard to be rescheduled at the beginning of the compute pipeline.

In Example 14, the subject matter of Examples 5-13 includes, wherein the signal indicating that the hazard has cleared does not include the type of hazard.

In Example 15, the subject matter of Example 14 includes, wherein to cause the instruction to be rescheduled at the beginning of the compute pipeline in response to the signal, the hazard management circuitry is configured to cause all instructions stored in the hazard memory to be rescheduled at the beginning of the compute pipeline.

In Example 16, the subject matter of Examples 1-15 includes, wherein the barrel processor is included in a programmable atomic unit.

In Example 17, the subject matter of Example 16 includes, wherein the programmable atomic unit is included in a memory controller.

In Example 18, the subject matter of Example 17 includes, wherein the memory controller is a chiplet in a chiplet system.

In Example 19, the subject matter of Examples 1-18 includes, wherein the barrel processor is a hybrid threading processor.

Example 20 is a method comprising: receiving, at hazard management circuitry, an indication of an instruction executing in a compute pipeline of a barrel processor, the instruction having encountered a hazard and unable to progress through the compute pipeline; storing the indication of the instruction in a hazard memory; receiving a signal indicating that the hazard has cleared; and causing the instruction to be rescheduled at the beginning of the compute pipeline in response to the signal.

In Example 21, the subject matter of Example 20 includes, removing the indication of the instruction from the hazard memory after causing the instruction to be rescheduled.

In Example 22, the subject matter of Examples 20-21 includes, storing a state of the instruction.

In Example 23, the subject matter of Examples 20-22 includes, storing a type of hazard corresponding to the indication of the instruction.

In Example 24, the subject matter of Example 23 includes, wherein the type of hazard is a memory store hazard.

In Example 25, the subject matter of Examples 23-24 includes, wherein the type of hazard is a memory load hazard.

In Example 26, the subject matter of Examples 23-25 includes, wherein the type of hazard is a fiber join hazard.

In Example 27, the subject matter of Examples 23-26 includes, wherein the type of hazard is a call hazard.

In Example 28, the subject matter of Examples 23-27 includes, wherein the type of hazard is an event listen hazard.

In Example 29, the subject matter of Examples 23-28 includes, wherein the type of hazard is a return hazard.

In Example 30, the subject matter of Examples 23-29 includes, wherein the signal indicating that the hazard has cleared includes the type of hazard.

In Example 31, the subject matter of Example 30 includes, wherein causing the instruction to be rescheduled at the beginning of the compute pipeline in response to the signal, comprises causing instructions of the type of hazard to be rescheduled at the beginning of the compute pipeline.

In Example 32, the subject matter of Examples 23-31 includes, wherein the signal indicating that the hazard has cleared does not include the type of hazard.

In Example 33, the subject matter of Example 32 includes, wherein causing the instruction to be rescheduled at the beginning of the compute pipeline in response to the signal comprises causing all instructions stored in the hazard memory to be rescheduled at the beginning of the compute pipeline.

In Example 34, the subject matter of Examples 20-33 includes, wherein the hazard management circuitry is integrated in the barrel processor, and the barrel processor is included in a programmable atomic unit.

In Example 35, the subject matter of Example 34 includes, wherein the programmable atomic unit included in a memory controller.

In Example 36, the subject matter of Example 35 includes, wherein the memory controller is a chiplet in a chiplet system.

In Example 37, the subject matter of Examples 20-36 includes, wherein the barrel processor is a hybrid threading processor.

Example 38 is at least one machine-readable medium including instructions that, when executed by processing circuitry, cause the processing circuitry to perform operations to implement of any of Examples 1-37.

Example 39 is an apparatus comprising means to implement of any of Examples 1-37.

Example 40 is a system to implement of any of Examples 1-37.

Example 41 is a method to implement of any of Examples 1-37.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A barrel processor, comprising:
hazard management circuitry;
wherein the barrel processor is configured to perform operations through use of the hazard management circuitry to:
store a state of an instruction in a hazard memory, in response to the instruction being unable to progress through a compute pipeline of the barrel processor due to encountering a hazard; and
cause the instruction to be rescheduled at the beginning of the compute pipeline in response to an indication that the hazard has cleared.

2. The barrel processor of claim 1, wherein the barrel processor is configured to detect the hazard.

3. The barrel processor of claim 1, wherein the barrel processor is configured to perform operations through use of the hazard management circuitry to remove the indication of the instruction from the hazard memory.

4. The barrel processor of claim 1, wherein the hazard memory is configured to store multiple states of the instruction.

5. The barrel processor of claim 1, wherein the hazard memory is configured to store a type of hazard corresponding to the instruction.

6. The barrel processor of claim 5, wherein the type of hazard is a memory store hazard.

7. The barrel processor of claim 5, wherein the type of hazard is a memory load hazard.

8. The barrel processor of claim 5, wherein the type of hazard is a fiber join hazard.

9. The barrel processor of claim 5, wherein the type of hazard is a call hazard.

10. The barrel processor of claim 5, wherein the type of hazard is an event listen hazard.

11. The barrel processor of claim 5, wherein the type of hazard is a return hazard.

12. The barrel processor of claim 5, wherein the indication that the hazard has cleared includes the type of hazard.

13. The barrel processor of claim 12, wherein to cause the instruction to be rescheduled at the beginning of the compute pipeline, the hazard management circuitry is to cause instructions of the type of hazard to be rescheduled at the beginning of the compute pipeline.

14. The barrel processor of claim 5, wherein the indication that the hazard has cleared does not include the type of hazard.

15. The barrel processor of claim 14, wherein to cause the instruction to be rescheduled at the beginning of the compute pipeline, the hazard management circuitry is configured to cause all instructions stored in the hazard memory to be rescheduled at the beginning of the compute pipeline.

16. The barrel processor of claim 1, wherein the barrel processor is included in a programmable atomic unit.

17. The barrel processor of claim 16, wherein the programmable atomic unit included in a memory controller.

18. The barrel processor of claim 17, wherein the memory controller is a chiplet in a chiplet system.

19. The barrel processor of claim 1, wherein the barrel processor is a hybrid threading processor.

20. A method comprising:

storing a state of an instruction in a hazard memory, in response to the instruction being unable to progress through a compute pipeline of a barrel processor due to a hazard; and causing the instruction to be rescheduled at the beginning of the compute pipeline in response to an indication that the hazard has cleared.

\* \* \* \* \*